June 12, 1923.

T. OLINGER

DAMPER AND DAMPER CLIP CONSTRUCTION

Filed Oct. 16, 1922

1,458,144

Inventor
Thomas Olinger
By Frank E. Liverance, Jr.
Attorney

Patented June 12, 1923.

1,458,144

UNITED STATES PATENT OFFICE.

THOMAS OLINGER, OF HOLLAND, MICHIGAN, ASSIGNOR TO FEDERAL STAMPING COMPANY, OF HOLLAND, MICHIGAN, A CORPORATION OF MICHIGAN.

DAMPER AND DAMPER-CLIP CONSTRUCTION.

Application filed October 16, 1922. Serial No. 594,835.

*To all whom it may concern:*

Be it known that I, THOMAS OLINGER, a citizen of the United States of America, residing at Holland, in the county of Ottawa and State of Michigan, have invented certain new and useful Improvements in Dampers and Damper-Clip Constructions; and I do hereby declare the following to be a full, clear, and exact description of the invention, such as will enable others skilled in the art to which it appertains to make and use the same.

This invention relates to a damper construction, and more particularly to a novel clip to be used in connection with the damper whereby a thin sheet metal disk may be used for the body portion of the damper, the clip being adapted for permanent connection thereto at one side for use in detachably connecting the usual and regular operating handle, said handle in the present invention having also features of novelty and an embodiment wherein its cost of production is reduced to the lowest amount. Understanding of the invention and the novel constructions embodying the same will be had from the following description, in connection with the accompanying drawing, in which, Fig. 1 is a vertical cross section through a furnace pipe equipped with the damper construction of my invention, which is shown in elevation.

Like reference characters refer to like parts in the several figures of the drawing.

Figure 1:
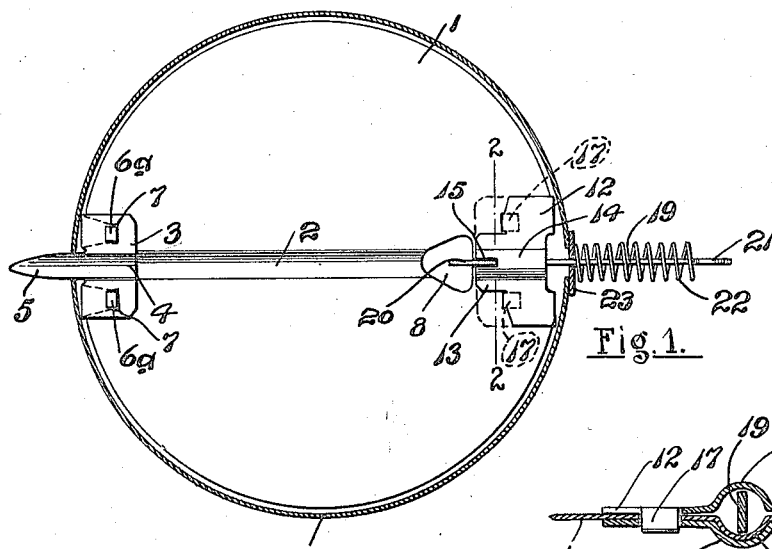
Figure 2:
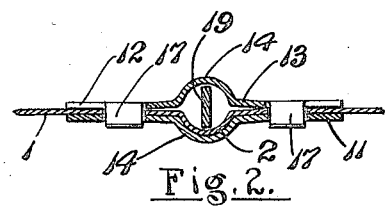
Fig. 2 is a fragmentary section through the damper and clip, taken on the line 2—2, of Fig. 1.
Figure 3:
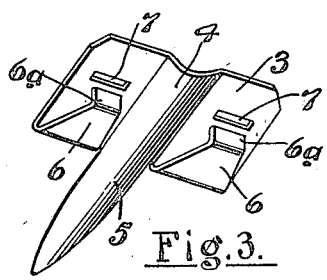
Fig. 3 is a perspective view of a tail piece clip adapted to be attached at the side of the damper disk directly opposite where the handle clip is attached.
Figure 4:
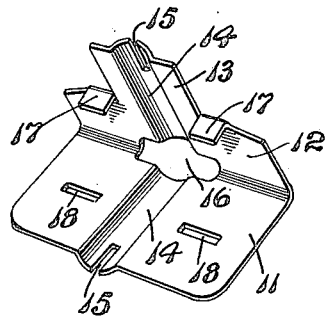
Fig. 4 is a perspective view of said handle clip, partly folded and ready for connection to the damper disk.

The damper disk 1 is of thin sheet metal, circular in outline, and formed across it at a diameter thereof with a rib 2 for reinforcement. At one end of the rib, a tail clip is secured, comprising a piece of sheet metal 3 formed with a rib or embossing 4 which is extended beyond the edge of the metal 3 and pointed to make a prong or tail 5 adapted to pass through an opening in the side of the furnace pipe in which the damper is installed. At each side of the tail 5, the clip is provided with reversely turned extensions 6 which are adapted to come against the side of the disk 1 opposite to that against which the part 3 bears, said extensions terminating in inwardly turned lips 6ª to pass through slots 7 in the member 3 and through similar slots in the disk 1, being then clinched over, as shown in Fig. 1, permanently connecting the tail piece to the disk with the rib 4 thereof seated in the grooved side of rib 2 on the disk.

Figure 6:
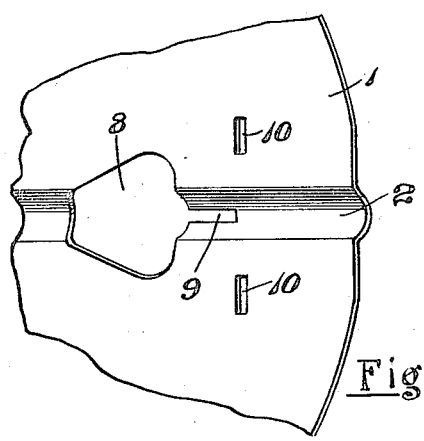
Fig. 6 is a fragmentary enlarged perspective view of the damper disk at the side where the handle clip is to be attached.
Figure 5:
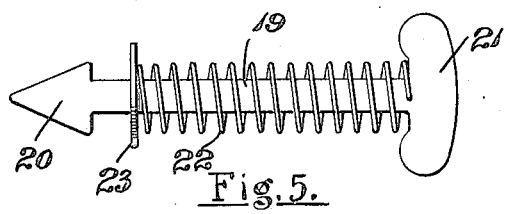
Fig. 5 is an elevation of the operating handle, with the usual spring mounted thereon.

Near the opposite side of the disk, a relatively large opening 8 is cut through the disk in symmetry with the diameter of the disk on which rib 2 is formed. A slot 9 joins with the outer side of the opening, said slot being cut in the highest portion of the rib 2. In addition two slots 10, one at each side of the rib and located perpendicular to the slot 9 are cut through the disk, as shown in Fig. 6.

A handle attaching clip is adapted to be secured to the disk at such opposite side. This clip comprises a piece of sheet metal bent to make two sides 11 and 12, the latter of which is cut back at each side of its center to leave a projecting portion 13. Both sides 11 and 12, including the portion 13 are formed with ribs 14 having slots 15, similar to slot 9 cut in their ends, and at the bend where sides 11 and 12 join, an elongated opening 16 is made. Lips 17 are turned from the edge of the side 12, one at each side of the portion 13 and are designed to pass through the openings or slots 18 cut in the side 11 of the clip and through like openings or slots in the damper disk, as heretofore described, at 10, being clinched against the side 11 of the clip so that a permanent connection of the clip to the disk is make. It will be noted that the rib 2 seats in the groove of the rib 14 of the side 11 of the clip and that the two ribs 14 on the two sides 11 and 12 extend in opposite directions whereby a substantially cylindrical opening is made for the passage of the operating handle. The slot 9 and one of the slots 15 are in conjunction, the other slot 15 being directly opposite.

The operating handle comprises a bar 19 of flat metal formed at one end with an arrow shaped head 20 and at its other end with a widened finger engaging head 21. The usual coiled spring 22 is placed around the bar 19, one end bearing against the head 21 and the other coming against a disk or washer 23 which is used to cover the opening in a side of the furnace pipe in which the damper is installed, in accordance with usual practice.

The damper disk with the tail piece attached thereto, as described, and with the handle securing clip attached to the disk at its opposite side, is adapted to be placed in a length of furnace pipe, indicated at 24, the part 5 passing through an opening in the side of the pipe. The handle clip comes adjacent a diametrically opposed opening in the pipe 24, and the arrow-shaped head 20 of the operating handle is passed through said opening, then through the opening 16, heretofore described, passing between the disk 1 and the side 12 and its extension 13 of the clip. The head 20 reaches the opening 8 in the disk 1, whereupon the operating handle may be turned through substantially ninety degrees, bringing the head 20 into position such that it may be received in the notches 9 and 15. This reception in the notches is insured by the spring 22 which has to be compressed in the act of inserting the operating handle, so that when the handle is released, the spring draws it back making a secure connection of the head 20 with the notches 9 and 15 in the disk and clip.

The clip construction described is strong and durable and will not give way under service, and it protects the thin sheet metal damper disk from any strain that might be imposed by operation of the handle. The damper disk may be of very thin gage metal, the heavier gage metal used in making the clips caring for the strains to which the damper may be subjected in use. The construction is very economical to produce, all parts being simple stampings very quickly and easily made from sheet metal. Few of the parts require more than one, or at the most two operations in a punch press to produce them. Economy in production, rapidity in production, durability, and full utility combine to make the invention one of practical merit. The appended claims define the invention and it is to be considered as comprehending all forms of structure coming within their scope.

I claim:

1. In combination, a disk of sheet metal, a sheet metal clip attached at one side of the disk, comprising two sides bent to lie one at each side of the disk, said clip and disk being formed for the passage of one end of an operating member between them, and interengaging means on the clip and disk and on the inner end of the operating member for detachably securing them together, substantially as described.

2. In combination, a disk of sheet metal, a sheet metal clip attached, one at each side of the disk and diametrically opposite each other, each of said clips having a side to lie against the disk and integral parts bent around the edge of the disk and lying against the opposite side thereof, said parts being provided with clinching lips to pass through the disk and clinch against the sides of the clips on the other side of the disk, one of said clips having an outwardly extending part to pass through an opening in a side of a furnace pipe, and means on the other clip for detachably connecting an operating handle thereto, substantially as described.

3. In combination, a disk of sheet metal, a sheet metal clip attached at one side of the disk, comprising a side to lie against a side of the disk, and a second side bent around the edge of the disk and lying against the opposite side thereof, means for permanently securing the clip to the disk, said disk having a rib pressed therein, and said clip having ribs pressed in the two sides thereof to correspond, said disk having an opening therethrough removing a part of the rib, and a notch in the rib joining with said opening, and said sides of the clip having corresponding notches at the free edges thereof and in the ribs thereof, said clip being provided with an opening at the junction of the two sides, substantially as and for the purposes described.

4. A clip for dampers, comprising a single piece of sheet metal bent transversely between its ends to make two sides adapted to lie one at each side of a damper disk, said clip having an elongated transverse opening therethrough at the bend joining the two sides thereof, each side of the clip being formed with a rib pressed therein from said opening to the free edge of the side, said ribs being pressed outwardly, and each rib, at the free edges of the sides of the clip having an elongated notch cut therein, substantially as described.

5. A damper clip formed as defined in claim 4, combined with clinching lips at the free edge of one of the sides of the clip turned inwardly to clinch against the other side of the clip substantially as described.

6. In combination, a damper disk, a sheet metal clip bent transversely between its ends to make two sides, one to lie on each side of the disk at one side edge thereof, said clip being formed for the passage of an operating handle between the sides thereof, and interengaging means on the inner end of said handle and on the sides of the clip for detachably securing them together, combined with yielding means for normally holding the handle and clip in operative engagement.

7. An operating handle for dampers, comprising a flat bar of sheet metal having an arrow shaped head at its inner end and a finger engaging head at the opposite end, said bar and heads all lying in the same plane, substantially as described.

8. In combination, a damper disk, a clip at one side thereof, including two sides, one located at each side of the disk, an operating handle comprising a flat bar with an arrow-shaped head at its inner end, and interengaging means between the disk and sides of the clip and said head of the bar for detachably connecting them together, substantially as described.

In testimony whereof I affix my signature.

THOMAS OLINGER.